United States Patent
Haga et al.

(10) Patent No.: US 9,071,107 B2
(45) Date of Patent: Jun. 30, 2015

(54) ROTOR UNIT, ROTATING ELECTRICAL MACHINE, AND METHOD FOR MANUFACTURING ROTOR UNIT

(75) Inventors: Hidehiro Haga, Kyoto (JP); Tatsuro Kawamoto, Kyoto (JP); Shunsuke Murakami, Kyoto (JP)

(73) Assignee: Nidec Corporation, Kyoto (JP)

( * ) Notice: Subject to any disclaimer, the term of this patent is extended or adjusted under 35 U.S.C. 154(b) by 160 days.

(21) Appl. No.: 13/990,430

(22) PCT Filed: Apr. 2, 2012

(86) PCT No.: PCT/JP2012/002273
§ 371 (c)(1),
(2), (4) Date: May 30, 2013

(87) PCT Pub. No.: WO2012/137464
PCT Pub. Date: Oct. 11, 2012

(65) Prior Publication Data
US 2013/0257184 A1    Oct. 3, 2013

(30) Foreign Application Priority Data

Apr. 2, 2011    (JP) ................................. 2011-082322

(51) Int. Cl.
*H02K 1/27* (2006.01)
*H02K 1/28* (2006.01)
*H02K 15/02* (2006.01)
*H02K 15/03* (2006.01)

(52) U.S. Cl.
CPC ............. *H02K 1/28* (2013.01); *Y10T 29/49012* (2015.01); *H02K 1/278* (2013.01); *H02K 15/03* (2013.01); *H02K 1/27* (2013.01); *H02K 15/02* (2013.01)

(58) Field of Classification Search
CPC .......... H02K 1/28; H02K 1/27; H02K 15/02; H02K 15/03; H02K 1/278
USPC ................................... 310/156.12, 43
See application file for complete search history.

(56) References Cited

U.S. PATENT DOCUMENTS 5,176,946 A * 1/1993 Wieloch .................... 428/138
5,682,072 A * 10/1997 Takahashi ................ 310/156.46
(Continued)

FOREIGN PATENT DOCUMENTS

JP    2010-141993 A    6/2010
JP    2011-067057 A    3/2011
(Continued)

OTHER PUBLICATIONS

Official Communication issued in International Patent Application No. PCT/JP2012/002273, mailed on Jun. 12, 2012.

*Primary Examiner* — Terrance Kenerly
(74) *Attorney, Agent, or Firm* — Keating & Bennett, LLP

(57) ABSTRACT

A rotor unit includes a rotor core made of laminated steel sheets that are vertically laminated, and a holder made of resin. The rotor core and the holder are fixed together through insert molding. For this reason, the process of manufacturing the rotor core and the holder is shortened. Additionally, in the outer peripheral surface of the rotor core, a portion of resin that defines the holder is present between the plurality of steel sheets that defines the rotor core. For this reason, the fixing strength of the rotor core and the holder improves. Additionally, since a separation between the rotor core and the holder is prevented, magnets can be easily press-fitted.

13 Claims, 11 Drawing Sheets

(56) References Cited

U.S. PATENT DOCUMENTS

| | | |
|---|---|---|
| 8,779,638 B2 * | 7/2014 | Burton et al. .................. 310/43 |
| 2008/0048517 A1 * | 2/2008 | Ochiai et al. .................. 310/218 |
| 2010/0026123 A1 * | 2/2010 | Feng et al. ............... 310/156.08 |
| 2010/0225194 A1 * | 9/2010 | Bahadir ................ 310/216.058 |
| 2011/0291498 A1 | 12/2011 | Sakata et al. |

FOREIGN PATENT DOCUMENTS

| | | |
|---|---|---|
| WO | 2006/008964 A1 | 1/2006 |
| WO | 2010/090303 A1 | 8/2010 |

* cited by examiner

ROTOR UNIT, ROTATING ELECTRICAL MACHINE, AND METHOD FOR MANUFACTURING ROTOR UNIT

BACKGROUND OF THE INVENTION

1. Field of the Invention

The present invention relates to a rotor unit, a rotating electrical machine, and a method of manufacturing a rotor unit.

2. Description of the Related Art

In the related art, an inner rotor type motor that rotates a rotor unit having magnets inside a coil is known. For example, WO 2006/008964A discloses a brushless motor including a stator, and a rotor arranged inside the stator.

The rotor of WO 2006/008964A includes a rotor shaft, a rotor core, a magnet holder, and six rotor magnets. Paragraph [0026] of WO 2006/008964A discloses that the rotor core is fixed to the rotor shaft, and the six rotor magnets are attached to an outer periphery of the rotor core. Additionally, Paragraph [0027] of WO 2006/008964A discloses that the magnet holder is fixed to the rotor shaft.

Additionally, Paragraph [0029] of WO 2006/008964A discloses that a fitting projection of the magnet holder is fitted into an electrode holder attachment groove formed at an outer peripheral portion of the rotor core. In WO 2006/008964A, such fitting prevents a holder arm of the magnet holder from slipping out of the rotor core in a radial direction.

However, WO 2006/008964A does not teach or suggest how to obtain axial fixing strength between the rotor core and the magnet holder. Particularly, if the rotor core and the magnet holder are not firmly fixed in an axial direction when the magnets are press-fitted to the magnet holder in the axial direction, there is a concern that the rotor core and the magnet holder may become separated from each other due to the load at the time of press-fitting.

SUMMARY OF THE INVENTION

A rotor unit for a rotating electrical machine in accordance with a first preferred embodiment of the present invention includes an annular rotor core made of laminated steel sheets that are vertically laminated; a plurality of magnets arranged in a circumferential direction around the rotor core; and a holder made of resin that holds the plurality of magnets. The holder includes a plurality of partitioning portions that extends vertically along an outer peripheral surface of the rotor core, and a coupling portion that connects the plurality of partitioning portions. The rotor core and the holder are fixed together through insert molding. In the outer peripheral surface of the rotor core, a portion of resin that defines the holder is present between the plurality of steel sheets that defines the rotor core. Each of the plurality of magnets is press-fitted into a pair of partitioning portions that are mutually adjacent.

A second preferred embodiment of the present invention is a method of manufacturing a rotor unit for a rotating electrical machine including an annular rotor core made of laminated steel sheets that are vertically laminated, a plurality of magnets arranged in a circumferential direction around the rotor core, and a holder made of resin that holds the plurality of magnets. The manufacturing method includes the following steps: a) arranging the rotor core inside a mold, injecting resin in a fluid state into the mold, and insert-molding the holder in a shape including a plurality of partitioning portions that extends vertically along an outer peripheral surface of the rotor core, and a coupling portion that connects the plurality of partitioning portions; and b) press-fitting one of the plurality of magnets to a pair of the plurality of partitioning portions that are mutually adjacent after step a).

According to the first preferred embodiment of the present invention, in the outer peripheral surface of the rotor core, a portion of resin that defines the holder is present between the plurality of steel sheets that defines the rotor core. This improves the fixing strength of the rotor core and the holder.

According to the second preferred embodiment of the present invention, the manufacturing process of the rotor core and the holder is shortened by the insert molding. Additionally, a portion of resin that defines the holder is present between the plurality of steel sheets that defines the rotor core. This improves the fixing strength of the rotor core and the holder. Additionally, since the separation between the rotor core and the holder is prevented, the plurality of magnets can be easily press-fitted.

The preferred embodiments of the present invention are arranged to achieve an improvement in perpendicularity of the upper end surface of the thrust portion with respect to the outside surface of the shaft.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
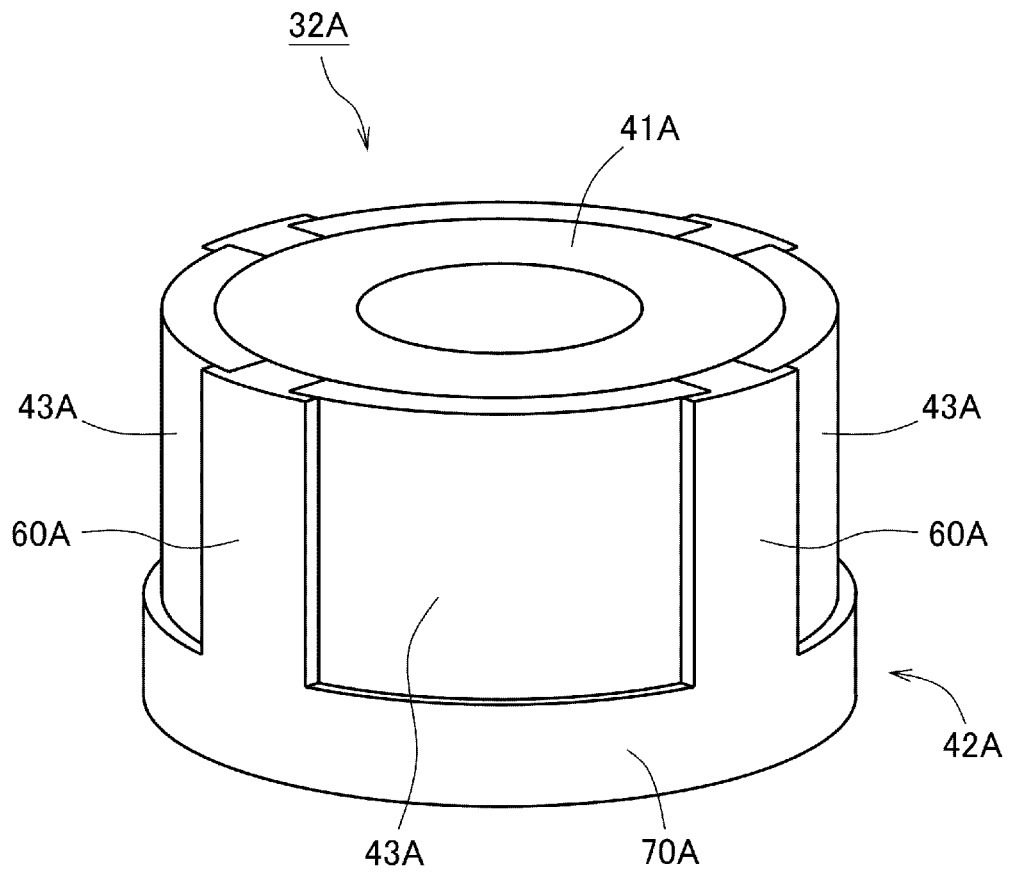
FIG. 1 is a perspective view of a rotor unit in accordance with a preferred embodiment of the present invention.

Exemplary preferred embodiments of the present invention will be described below, referring to the drawings. In addition, the shapes and positional relationship of respective portions will be described with a direction along the central axis of a rotating electrical machine being a vertical direction. However, this merely defines the vertical direction for the convenience of description, and does not limit the posture of a rotor unit and a rotating electrical machine according to various preferred embodiments of the present invention when being used.

FIG. 1 is a perspective view of a rotor unit 32A for a rotating electrical machine related to one preferred embodiment of the present invention. As shown in FIG. 1, the rotor unit 32A preferably includes a rotor core 41A, a holder 42A, and a plurality of magnets 43A.

The rotor core 41A is preferably an annular member made of, for example, laminated steel sheets that are vertically laminated. The holder 42A is a member made of resin, which holds the magnets 43A. The holder 42A includes a plurality of partitioning portions 60A and a coupling portion 70A. The plurality of partitioning portions 60A extends vertically along the outer peripheral surface of the rotor core 41A, respectively. The coupling portion 70A connects the plurality of partitioning portions 60A. The plurality of magnets 43A is arranged in the circumferential direction around the rotor core 41A. Each magnet 43A is preferably press-fitted into a pair of partitioning portions 60 that are mutually adjacent.

When the rotor unit 32A is manufactured, first, the rotor core 41A is arranged inside a mold. Then, resin in a fluid state is injected into the mold. By injecting resin, the holder 42A is insert-molded in a shape including the plurality of partitioning portions 60A and a coupling portion 70A. Thereafter, the magnet 43A is preferably press-fitted between a pair of partitioning portions 60A that are mutually adjacent.

Figure 2:
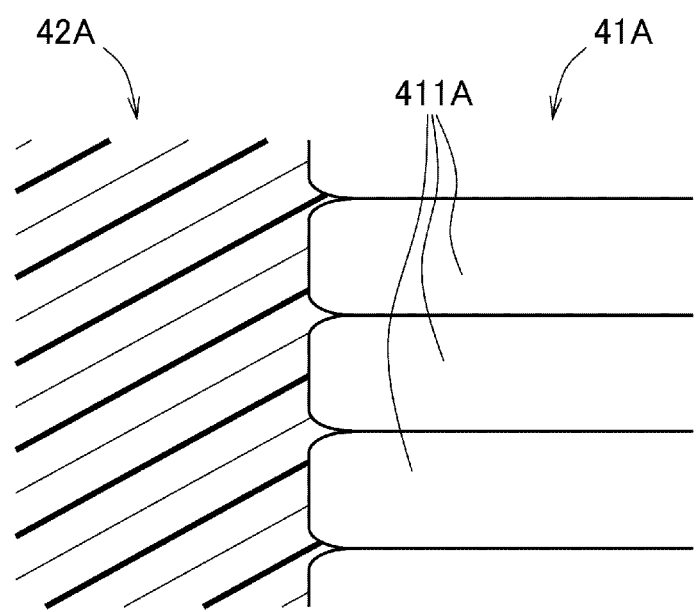
FIG. 2 is a longitudinal sectional view in the vicinity of a boundary portion between a rotor core and a holder in accordance with a preferred embodiment of the present invention.

As such, in the present preferred embodiment, the rotor core 41A and the holder 42A are fixed together through insert molding. For this reason, the process of manufacturing the rotor core 41A and the holder 42A is shortened. FIG. 2 is a longitudinal sectional view in the vicinity of a boundary portion between the rotor core 41A and the holder 42A. As shown in FIG. 2, a portion of the resin that defines the holder 42A is provided directly adjacent to a plurality of steel sheets 411A that defines the rotor core 41A in the outer peripheral surface of the rotor core 41A. This firmly fixes the rotor core 41A and the holder 42A. Additionally, since the separation between the rotor core 41A and the holder 42A is preferably prevented, the magnets 43A can be easily press-fitted.

Subsequently, a more specific preferred embodiment of the present invention will be described.

Figure 3:
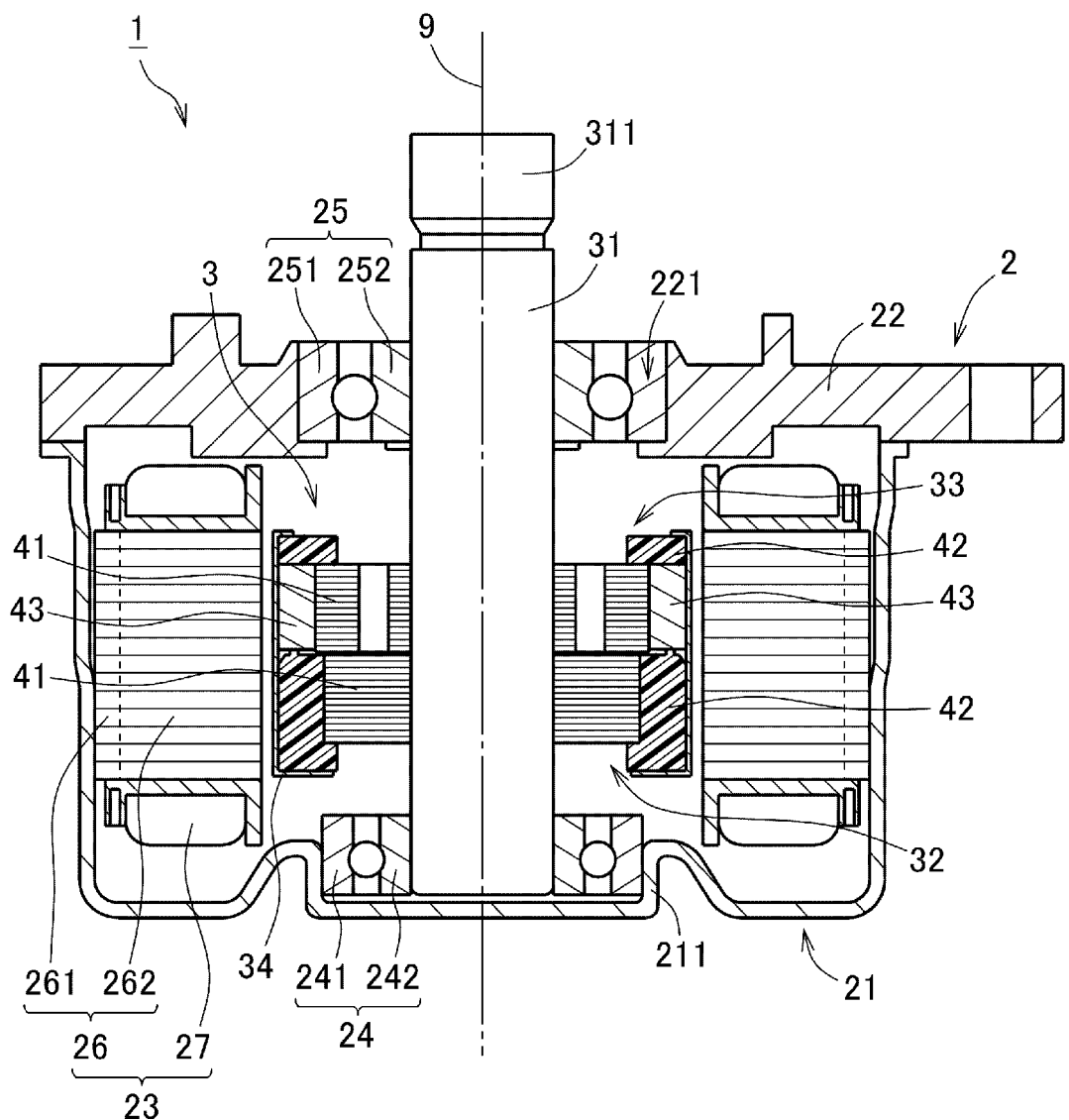
FIG. 3 is a longitudinal sectional view of a motor in accordance with a preferred embodiment of the present invention.

FIG. 3 is a longitudinal sectional view of the motor 1 that becomes an example of a rotating electrical machine made in accordance with a preferred embodiment of the present invention. The motor 1 of the present preferred embodiment is preferably mounted on an automobile, and is used in order to generate a driving force for, for example, a power steering system. As shown in FIG. 3, the motor 1 includes a stationary portion 2 and a rotating portion 3. The rotating portion 3 is rotatably supported with respect to the stationary portion 2.

The stationary portion 2 of the present preferred embodiment preferably includes a housing 21, a lid portion 22, an armature 23, a lower bearing 24, and an upper bearing 25.

The housing 21 is a bottomed, cylindrical or substantially cylindrical housing that accommodates the armature 23, the lower bearing 24, and the rotating portion 3 therein. A recess 211 that holds the lower bearing 24 is arranged at the center of the bottom of the housing 21. The lid portion 22 is a flat or substantially flat plate-shaped member that closes an upper opening of the housing 21. A circular hole 221 that holds the upper bearing 25 is arranged at the center of the lid portion 22.

The armature 23 generates magnetic flux in response to a driving current. The armature 23 includes a stator core 26 and a coil 27. The stator core 26 is preferably made of, for example, laminated steel sheets in which a plurality of steel sheets is laminated in an axial direction (i.e., a direction along the central axis 9).

The stator core 26 preferably includes an annular core back 261, and a plurality of teeth 262 that protrude toward the inside in a radial direction (i.e., a direction orthogonal to the central axis 9) from the core back 261. The core back 261 is fixed to the inner peripheral surface of the side wall of the housing 21. The coil 27 is preferably defined by conducting wires that are respectively wound around each tooth 262 of the stator core 26.

The lower bearing 24 and the upper bearing 25 rotatably support a shaft 31 on the side of the rotating portion 3. Ball bearings that allow an outer ring and an inner ring to rotate relatively via balls are preferably used for the lower bearing 24 and the upper bearing 25 of the present preferred embodiment.

An outer ring 241 of the lower bearing 24 is preferably fixed to the recess 211 of the housing 21. Additionally, an outer ring 251 of the upper bearing 25 is preferably fixed to the edge of the circular hole 221 of the lid portion 22. On the other hand, inner rings 242 and 252 of the lower bearing 24 and the upper bearing 25 are preferably fixed to the shaft 31. For this reason, the shaft 31 is rotatably supported with respect to the housing 21 and the lid portion 22.

The rotating portion 3 of the present preferred embodiment preferably includes the shaft 31, a pair of rotor units 32 and 33, and a cover 34.

The shaft 31 is a preferably a cylindrical or substantially cylindrical member that extends in the vertical direction along the central axis 9. The shaft 31 rotates about the central axis 9, and is supported by the above-described lower bearing 24 and upper bearing 25. Additionally, the shaft 31 preferably includes a head 311 that protrudes upward from the lid portion 22. The head 311 is preferably coupled to a power steering device of an automobile via a power transmission mechanism, such as, for example, a gear.

The pair of rotor units 32 and 33 and the cover 34 rotate along with the shaft 31 radially inside the armature 23. The pair of rotor units 32 and 33 preferably include a rotor core 41, a magnet holder 42, and a plurality of magnets 43, respectively. The pair of rotor units 32 and 33 is arranged in the axial direction in a state where the units are turned upside down. The detailed structure of the rotor units 32 and 33 will be described below.

The cover 34 is a cylindrical or substantially cylindrical member that holds the pair of rotor units 32 and 33. The cover 34 is arranged to cover the outer peripheral surface of the rotor units 32 and 33 and portions of upper and lower end surfaces of the rotor units. As a result, the pair of rotor units 32 and 33 is preferably maintained in a state where the units are brought close to each other or brought into contact with each other.

In such a motor 1, if a driving current is applied to the coil 27 of the stationary portion 2; radial magnetic flux is generated in the plurality of teeth 262 of the stator core 26. Then, circumferential torque is generated by the action of the magnetic flux between the teeth 262 and the magnet 43, and the rotating portion 3 rotates about the central axis 9 with respect to the stationary portion 2. If the rotating portion 3 rotates, a driving force is transmitted to the power steering device coupled to the shaft 31.

As described above, the motor 1 of the present preferred embodiment preferably includes the pair of rotor units 32 and 33. The detailed structure of the rotor unit 32 arranged on the lower side will be described below. Although the rotor unit 33 on the upper side is arranged in a state where the rotor unit 32 arranged on the lower side is vertically reversed, since the structure itself thereof is equivalent to that of the lower rotor unit 32, duplicate description thereof will be omitted.

Figure 4:
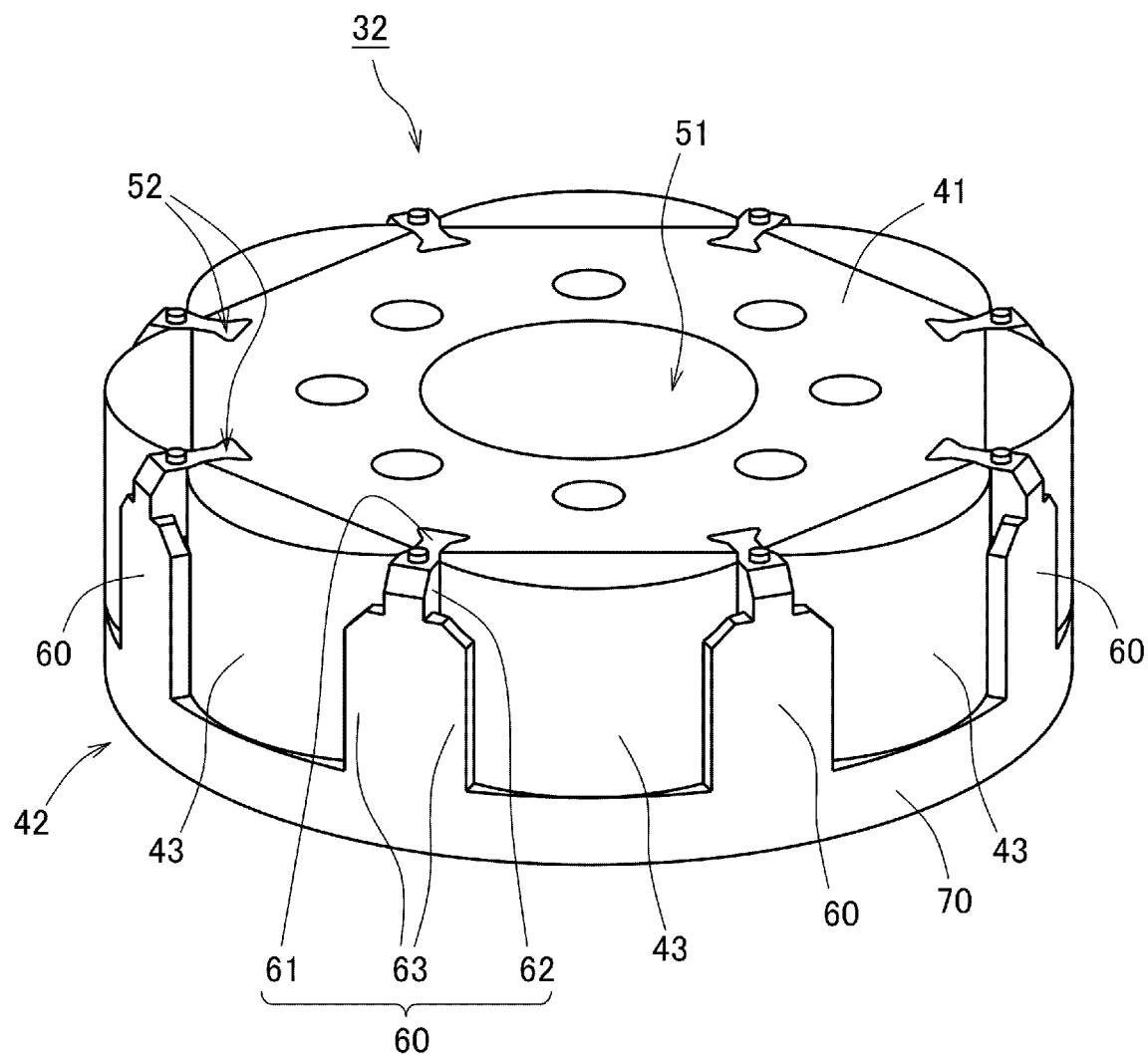
FIG. 4 is a perspective view of the rotor unit in accordance with a preferred embodiment of the present invention.
Figure 5:
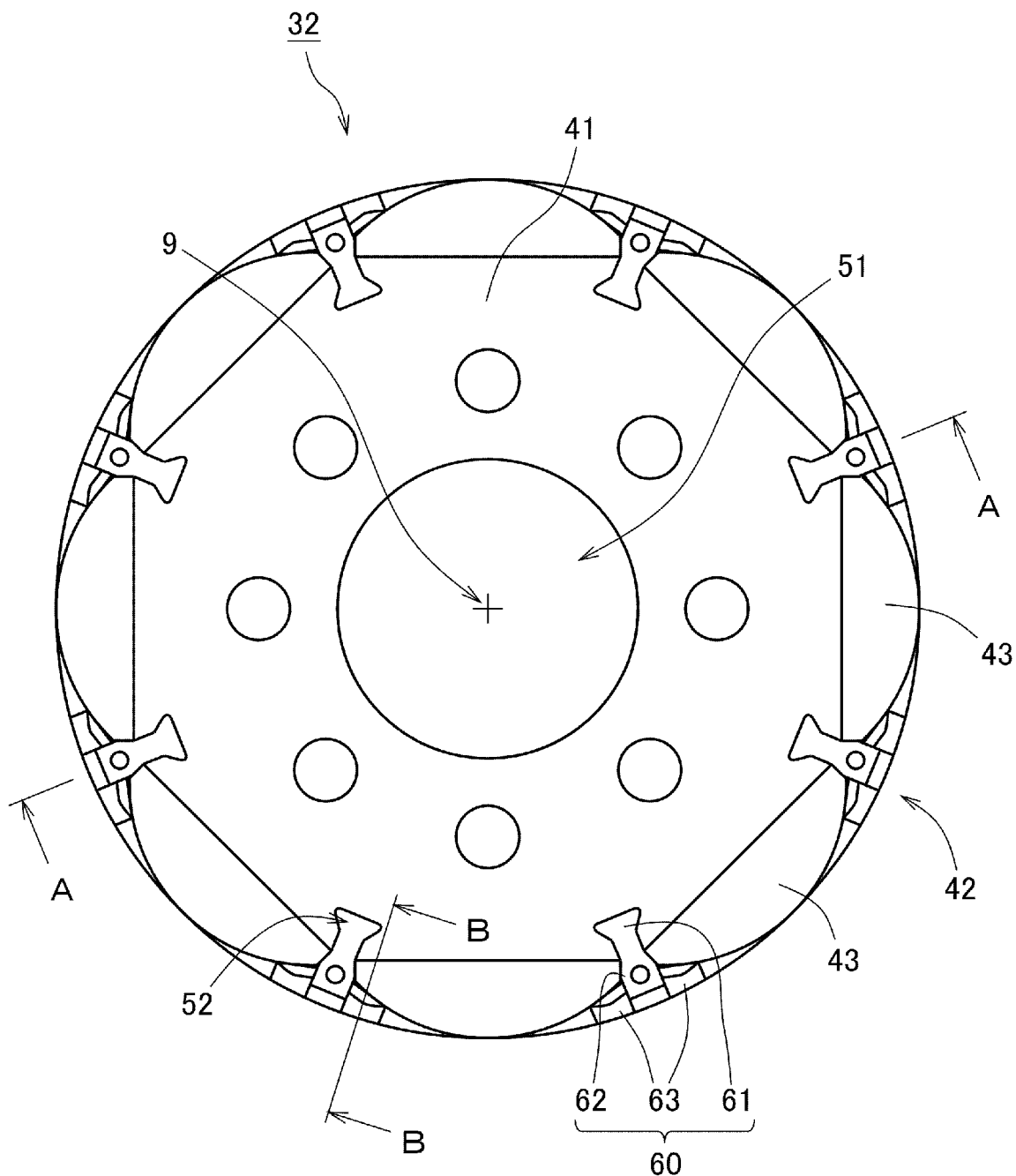
FIG. 5 is a top view of the rotor unit in accordance with a preferred embodiment of the present invention.

FIG. 4 is a perspective view of the rotor unit 32. FIG. 5 is a top view of the rotor unit 32. As shown in FIGS. 4 and 5, the rotor unit 32 includes the rotor core 41, the magnet holder 42, and the plurality of magnets 43.

The rotor core 41 is an annular member fixed to the shaft 31. The rotor core 41 is preferably made of, for example, laminated steel sheets in which electromagnetic steel sheets are vertically laminated. The rotor core 41 of the present preferred embodiment has a regular polygonal columnar appearance. A through hole 51 that allows the shaft 31 to be inserted therethrough is provided at the center of the rotor core 41. Additionally, the outer peripheral surface of the rotor core 41 is preferably provided with a plurality of groove portions 52 that extends in the axial direction. The groove portions 52 are depressed radially inward at boundary portions of a plurality of planes that defines the outer peripheral surface of the rotor core 41.

The magnet holder 42 is a preferably member which is made of resin and which holds the magnets 43. The magnet holder includes a plurality of partitioning portions 60, and a coupling portion 70 that connects lower ends of the plurality of partitioning portions 60. The plurality of partitioning portions 60 is arranged at equal or substantially equal intervals in the circumferential direction. Each partitioning portion 60 extends in the axial direction along the lateral surface of the rotor core 41 in the vicinity of each groove portion 52 of the rotor core 41. The coupling portion 70 is a circular portion located below the plurality of partitioning portions 60. A radial inside portion of the coupling portion 70 comes in contact with the lower surface of the rotor core 41.

Figure 6:
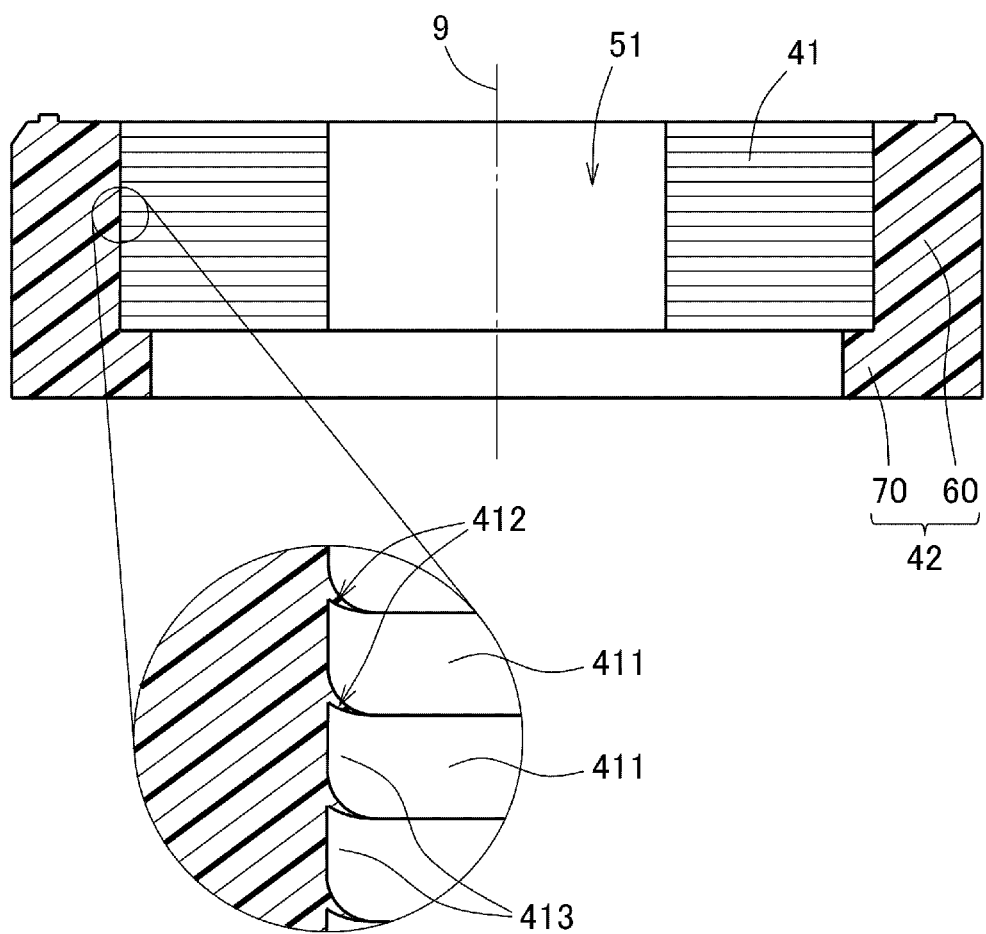
FIG. 6 is a longitudinal sectional view of the rotor unit in accordance with a preferred embodiment of the present invention.

FIG. 6 is a longitudinal sectional view of the rotor unit 32 seen from the position A-A in FIG. 5. In the present preferred embodiment, the magnet holder 42 is preferably defined on the surface of the rotor core 41 in an integral manner through insert molding. When insert molding is performed, resin is injected into a mold to be molded in a state where the rotor core 41 is arranged inside the mold in advance. Then, the rotor core 41 and the magnet holder 42 are fixed to each other by hardening of the resin.

In FIG. 6, a portion of a boundary between the rotor core 41 and the magnet holder 42 is shown in an enlarged manner. As shown in the enlarged view, gaps 412 are present between adjacent ones of the plurality of steel sheets 411 that defines the rotor core 41 in the vicinity of the outer peripheral surface of the rotor core 41. A portion of the resin that defines the magnet holder 42 is present in the gaps 412. This is provided as resin in a fluid state which enters the gaps 412 of the rotor core 41 when insert molding is performed.

As for the rotor core 41 and the magnet holder 42 of the present preferred embodiment, both the members slightly bite into each other at the boundary portion thereof. As a result, the rotor core 41 and the magnet holder 42 are firmly fixed. Particularly, resin is present in an axial gap formed between a steel sheet 411 and an adjacent steel sheet 411. For this reason, the axial relative movement between the rotor core 41 and the magnet holder 42 is prevented.

The plurality of steel sheets 411 that defines the rotor core 41 is preferably obtained by, for example, punching. For this reason, as shown in the enlarged view in FIG. 6, a curved portion 413 according to the direction of punching is formed at the end of each steel sheet. In the present preferred embodiment, the curved portion 413 is curved toward an upper side. For this reason, an upward coming-off of the rotor core 41 with respect to the magnet holder 42 is further prevented.

Additionally, as shown in FIGS. 4 and 5, each partitioning portion 60 of the present preferred embodiment preferably includes an engaging portion 61 that is held in each groove portion 52 of the rotor core 41. At the time of insert molding, the engaging portion 61 is preferably defined as the resin that has flowed into the groove portion 52 hardens. For this reason, a gap is not easily generated between the engaging portion 61 and the rotor core 41 in the groove portion 52. Accordingly, the rotor core 41 and the magnet holder 42 are more firmly fixed.

Particularly, in the present preferred embodiment, the engaging portion 61 of which the dimension in a width direction increases toward the inside in the radial direction engages the groove portion 52 of which the dimension in the width direction decreases toward the outside in the radial direction. This further prevents the radial separation of the rotor core 41 and the magnet holder 42.

The plurality of magnets 43 is arranged around the rotor core 41. Each magnet 43A is preferably arcuate or substantially arcuate on an external diameter side thereof and linear or substantially linear on the internal diameter side thereof, and is, for example, press-fitted into a pair of partitioning portions 60 that are mutually adjacent. The radial outside surface of the magnet 43 is a magnetic polar surface that faces the armature 23. The plurality of magnets 43 is arranged at equal or substantially equal intervals so that an N magnetic polar surface and an S magnetic polar surface are alternately arranged in the circumferential direction. In addition, for example, an Nd—Fe—B alloy based sintered magnet can preferably be used for a magnet 43.

Figure 7:
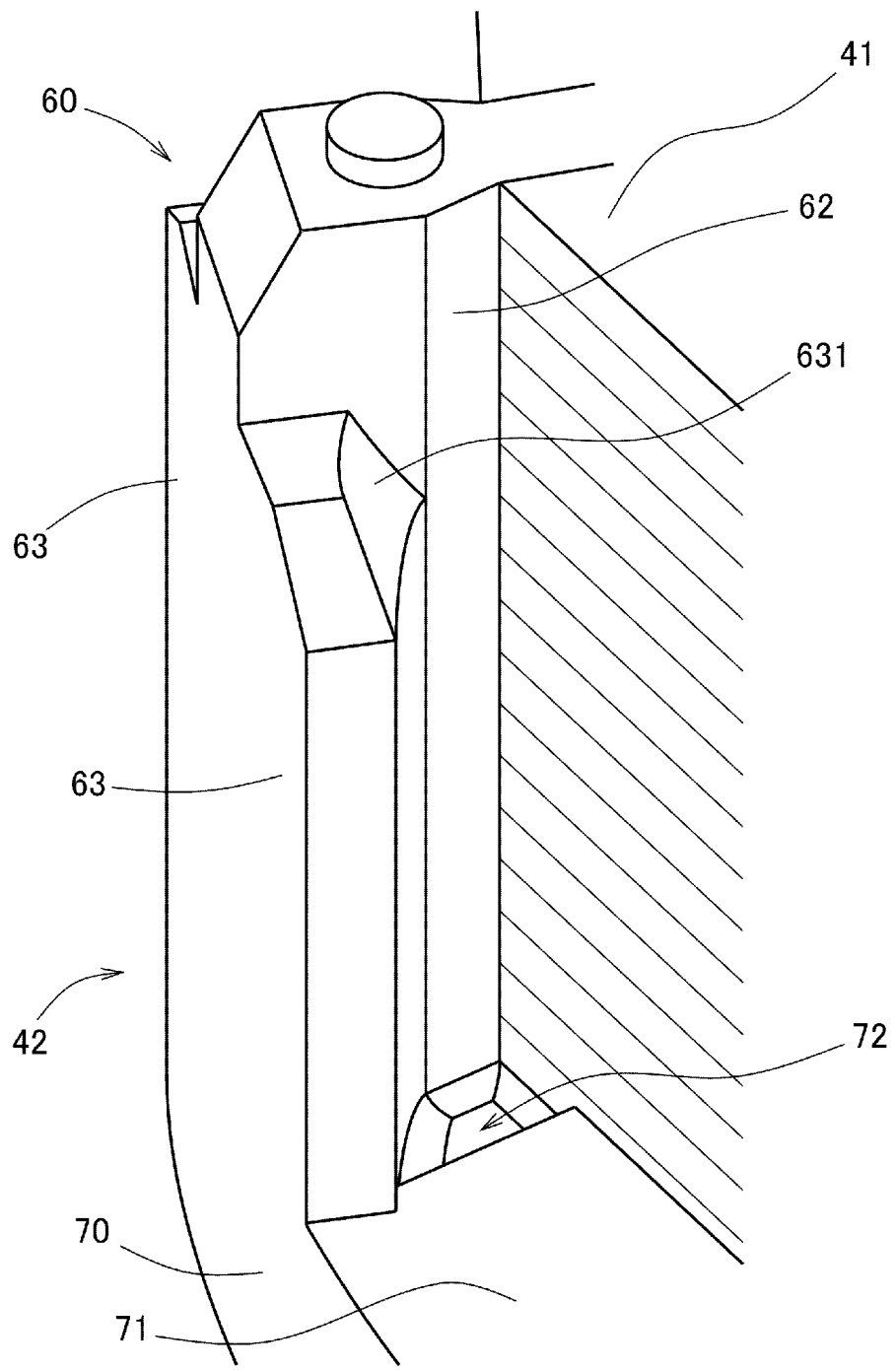
FIG. 7 is a partially perspective view of the rotor core and a magnet holder in accordance with a preferred embodiment of the present invention.

FIG. 7 is a partial perspective view of the rotor core 41 and the magnet holder 42. The detailed shape of the magnet holder 42 will be described, referring to FIGS. 4, 5, and 7.

The partitioning portion 60 of the magnet holder 42 preferably includes a columnar portion 62 and a wall portion 63. The columnar portion 62 is a portion that extends in the axial direction between the magnets 43 that are mutually adjacent. The wall portion 63 is a portion that extends toward one side or the other side in the circumferential direction from the columnar portion 62. The radial outside surface of the magnet 43 is partially covered with the wall portion 63.

An upper end of the wall portion 63 is located lower than an upper end of the rotor core 41. For this reason, when a magnet 43 is attached, the lower end of the magnet 43 is brought into contact with the lateral surface of the rotor core 41, so that the magnet 43 can be positioned in the radial direction. The magnet 43 positioned in the radial direction can be press-fitted radially inward of the wall portion 63.

Additionally, the upper end of the wall portion 63 is located lower than an upper end of the columnar portion 62. For this reason, when a magnet 43 is attached, the lower end of the magnet 43 can be easily inserted between the pair of columnar portions 62 that are mutually adjacent. Additionally, the magnet 43 can be positioned in the radial direction by the pair of columnar portions 62, and then, the magnet 43 can then be press-fitted radially inward of the wall portion 63.

If the magnet 43 is positioned in the radial direction and the circumferential direction in this way, biasing of the load at the time of press-fitting is prevented. Accordingly, it is possible to prevent the magnet 43 from shaving off the partitioning portions 60 of the magnet holder 42 and generating dust at the time of press-fitting.

Additionally, in the present preferred embodiment, an inclined surface 631 is preferably provided in the vicinity of an upper end of the radial inside surface of the wall portion 63. The inclined surface 631 gradually approaches the outer peripheral surface of the rotor core 41 downward from an upper end. The inclined surface 631 preferably guides the magnet 43 radially inward of the wall portion 63 at the time of the press-fitting of the magnet 43. This facilitates the press-fitting work of the magnet 43. Additionally, as the magnet 43 is guided to a proper position, biasing of the load at the time of press-fitting is further prevented. As a result, generation of dust accompanying the press-fitting is further prevented.

Additionally, if such an inclined surface 631 is provided, the vicinity of the upper end of the wall portion 63 can be easily separated from a mold at the time of insert molding. In this way, the inclined surface 631 has technical value at both of the time press-fitting and the time insert molding.

The coupling portion 70 preferably includes a bottom 71 located below the magnet 43. That is, the bottom 71 is also arranged at a circumferential position between the partitioning portions 60 that are mutually adjacent. The lower surface of the magnet 43 after press-fitting surfaces the upper surface of the bottom 71 in the axial direction, and the lower surface of the magnet 43 and the upper surface of the bottom 71 separate from or come into contact with each other. Additionally, the bottom 71 preferably includes a recess 72 below both ends the magnet 43 in the circumferential direction. The recess 72 of the present preferred embodiment is preferably provided at a position surrounded by the lateral surface of the rotor core 41, the columnar portion 62, and the wall portion 63.

Even if the magnet 43 contacts the columnar portion 62 or the wall portion 63 to generate dust at the time of the press-fitting of the magnet 43, the dust is received in the recess 72. For this reason, it is possible to prevent a problem of the dust being caught between the upper surface of the bottom and the lower surface of the magnet 43, whereby the axial position of the magnet 43 deviates. Additionally, the recess 72 is sealed by the lower surface of the magnet 43 after press-fitting, and becomes a closed space. For this reason, scattering of the dust received in the recess 72 to the outside is prevented.

In addition, at the time of the press-fitting of the magnet 43, the columnar portion 62 receives a stronger load from the magnet 43 than the wall portion 63. Accordingly, the columnar portion 62 becomes a source of dust more easily than the wall portion 63. If this point is taken into consideration, it is preferable that the recess 72 be provided at least at a position adjacent to the lower end of the columnar portion 62.

Figure 8:
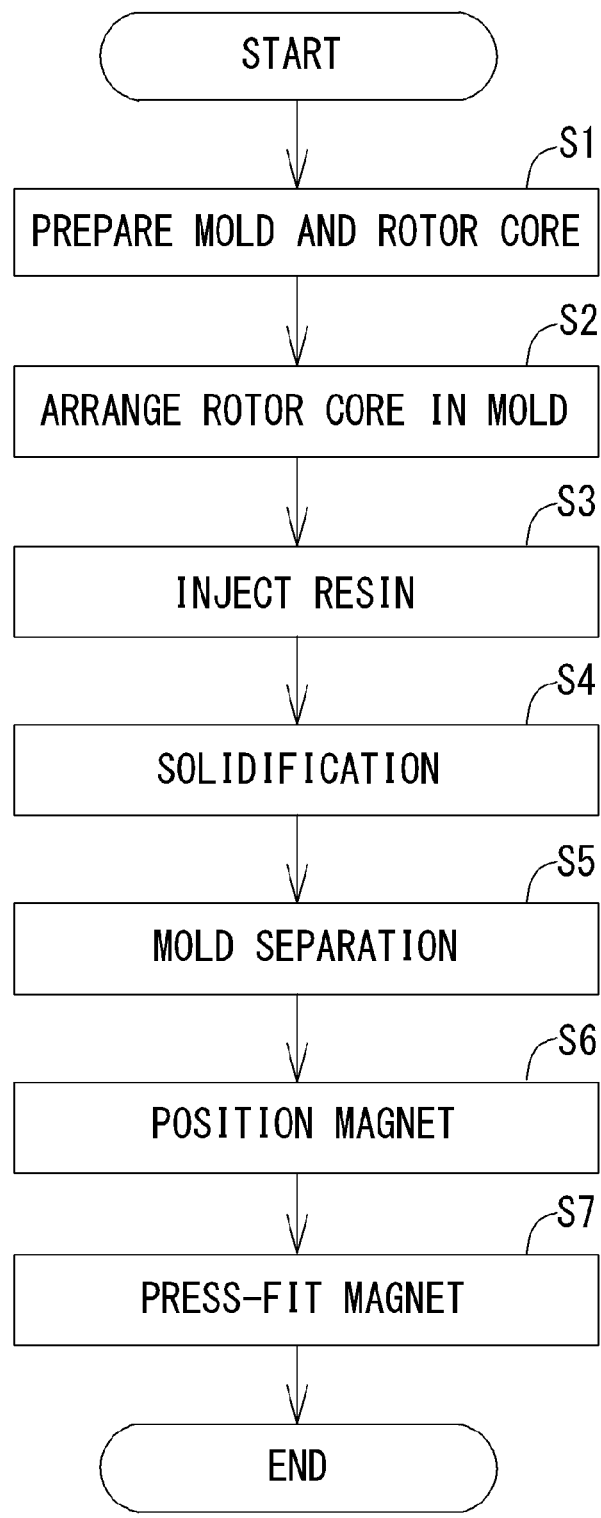
FIG. 8 is a flowchart showing a manufacturing procedure of the rotor unit in accordance with a preferred embodiment of the present invention.
Figure 9:
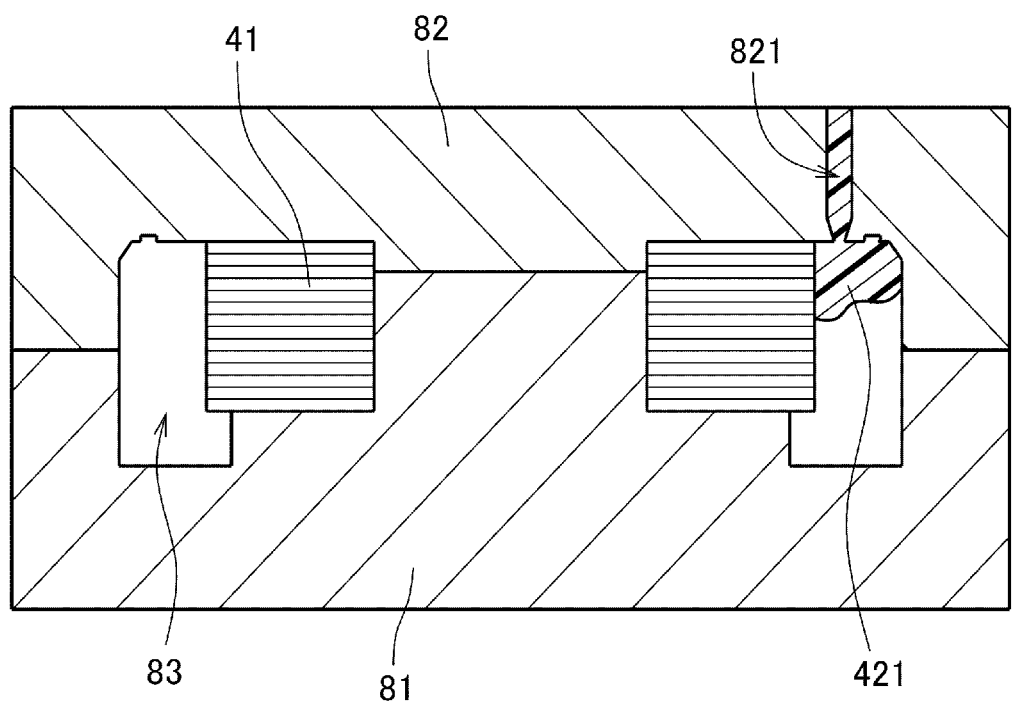
FIG. 9 is a longitudinal sectional view showing the state when insert molding is performed in accordance with a preferred embodiment of the present invention.
Figure 10:
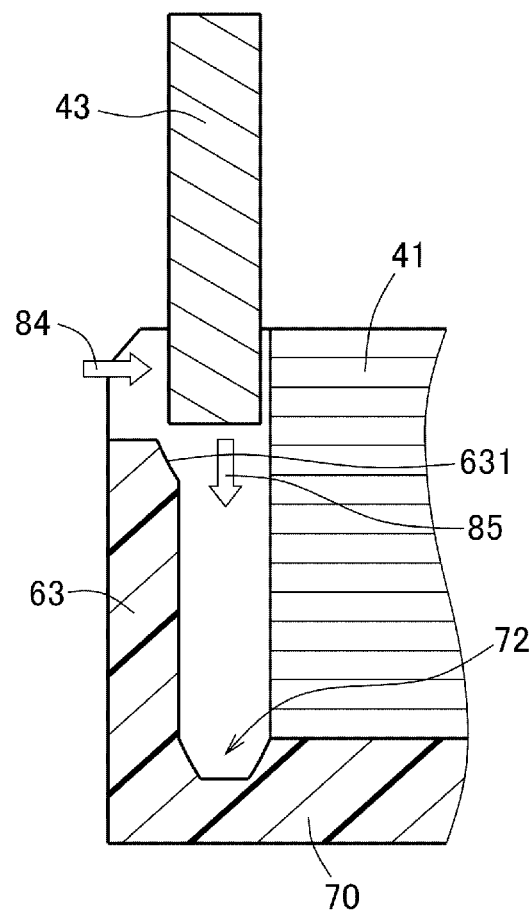
FIG. 10 is a partially longitudinal cross-sectional view of the rotor unit in accordance with a preferred embodiment of the present invention before a magnet is press-fitted.
Figure 11:
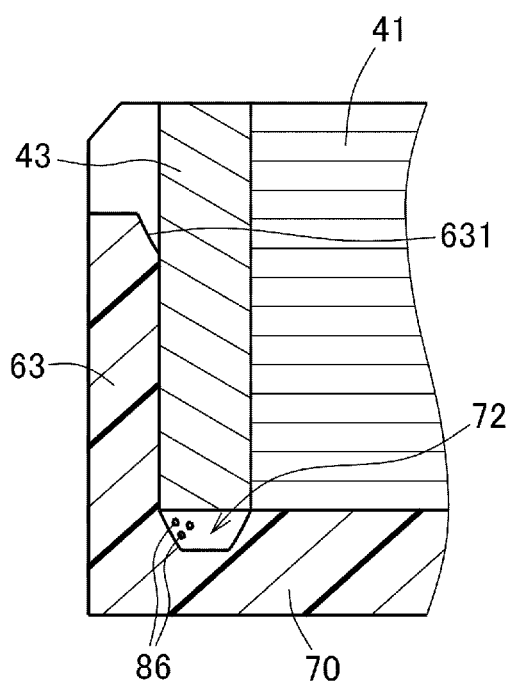
FIG. 11 is a partially longitudinal sectional view of the rotor unit in accordance with a preferred embodiment of the present invention after the magnet is press-fitted.

Subsequently, an example of a method of manufacturing the rotor unit 32 will be described, referring to FIGS. 8 to 11. FIG. 8 is a flowchart showing a manufacturing procedure of the rotor unit 32. FIG. 9 is a longitudinal sectional view showing the state where insert molding is performed. The position of the section of FIG. 9 is equivalent to the position A-A in FIG. 5 after manufacture. Additionally, FIGS. 10 and 11 are longitudinal sectional views showing the state when the magnet is press-fitted to the magnet holder 42. The positions of the sections of FIGS. 10 and 11 are equivalent to the position B-B in FIG. 5 after manufacture.

When the rotor unit 32 is manufactured, first, a pair of molds 81 and 82 and the rotor core 41 made in advance are prepared (Step S1). The pair of molds 81 and 82 define a cavity inside the pair of molds 81 and 82 by bringing mutually opposed surfaces into contact with each other. The cavity 83 corresponds to the shape of the rotor core 41 and the magnet holder 42. The rotor core 41 is preferably made of laminated steel sheets in which steel sheets subjected to punching are laminated in the axial direction.

Next, the rotor core 41 is arranged inside the pair of molds 81 and 82 (Step S2). Here, first, the rotor core 41 is set inside one mold 81. Then, the upper portion of the mold 81 is closed by the other mold 82. As a result, the cavity 83 is formed inside molds 81 and 82, bringing a state where the rotor core 41 is arranged in the cavity 83.

Thereafter, resin 421 in a fluid state is injected into the cavity 83 (Step S3). Here, as shown in FIG. 9, the resin 421 in the fluid state is injected into the cavity 83 through a runner 821 provided in the mold 82. The resin 421 in the fluid state also flows into the groove portions of the rotor core 41. Additionally, in the lateral surface of the rotor core 41, the resin 421 in a fluid state also enters gaps among the plurality of steel sheets 411 that define the rotor core 41.

If the resin 421 in the fluid state spreads in the cavity 83, the resin 421 in the mold 81 and 82 is cooled and solidified (Step S4) such that the resin 421 in the mold 81 and 82 is solidified into the magnet holder 42. The magnet holder 42 is molded in a shape including the plurality of partitioning portions 60 and the coupling portion 70, including the above described engaging portion 61, the columnar portion 62, the wall portion 63, the inclined surface 631, the bottom 71, and the recess 72.

Additionally, the rotor core 41 and the magnet holder 42 are fixed along with the solidification of the resin. As a result, in the lateral surface of the rotor core 41, a portion of the resin that defines the magnet holder 42 is present among the plurality of steel sheets 411 that defines the rotor core 41. As a result, the rotor core 41 and the magnet holder 42 are firmly fixed.

Thereafter, the pair of molds 81 and 82 are opened, and the rotor core 41 and the magnet holder 42 are separated from the molds 81 and 82 (Step S5). The inclined surface 631 is preferably arranged at the upper end of the wall portion 63 of the magnet holder 42. For this reason, the wall portion 63 can be easily separated from the mold 82.

The above Steps S1 to S5 are an example of the insert molding. As a result, the rotor core 41 and the magnet holder 42 of FIG. 6 are obtained. At the time of insert molding, both the molding of the magnet holder 42 and the fixation of the rotor core 41 and the magnet holder 42 are performed. For this reason, the process of manufacturing the rotor core 41 and the magnet holder 42 is shortened.

Subsequently, a magnet 43 is prepared, and the magnet is positioned at a position to be inserted with respect to the rotor core 41 and the magnet holder 42 (Step S6). Here, first, a lower end of the magnet 43 is brought close to the lateral surface of the rotor core 41 above the wall portion 63 as indicated by an arrow 84 in FIG. 10. Then, the lower end of the magnet 43 is brought into contact with the lateral surface of the rotor core 41. This determines the radial position of the magnet 43. Further, the lower end of the magnet 43 is inserted between a pair of columnar portions 62 that are mutually adjacent. This determines the circumferential position of the magnet 43.

Next, the magnet 43 is moved downward as indicated by an arrow 85 in FIG. 10. Here, the inclined surface 631 is provided at the upper end of the wall portion 63. For this reason, even if the position of the magnet 43 has deviated slightly, if the lower end of the magnet 43 is moved along the inclined surface 631, the magnet 43 is guided radially inward of the wall portion 63. This more precisely determines the position of the magnet 43.

Thereafter, the magnet 43 is press-fitted to the pair of columnar portions 62 that are mutually adjacent and the wall portion 63 (Step S7). In the above step S6, the magnet 43 is positioned in the radial direction and in the circumferential direction. For this reason, biasing of the load at the time of press-fitting is prevented. As a result, generation of dust accompanying the press-fitting is prevented.

Additionally, the magnet holder 42 of the present preferred embodiment includes the recess 72 below both ends the magnet 43 in the circumferential direction. For this reason, even if the magnet 43 shaves off a portion of the partitioning portion 60 so as to generate dust 86 at the time of press-fitting, as shown in FIG. 11, the dust 86 can be received in the recess 72. For this reason, it is possible to prevent a problem of the dust being caught between the upper surface of the bottom and the lower surface of the magnet 43, whereby the axial position of the magnet 43 deviates. Additionally, the recess 72 is sealed by the lower surface of the magnet 43 after press-fitting. For this reason, scattering the dust 86 received in the recess 72 to the outside is prevented.

Additionally, the rotor core 41 and the magnet holder 42 are firmly fixed together through insert molding. For this reason, the load at the time of the press-fitting of the magnet prevents the rotor core 41 and the magnet 42 from being separated from each other. Accordingly, the magnet 43 can preferably be easily press-fitted.

If a plurality of magnets is intended to be arranged inside the mold at the time of the above insert molding, it is necessary to fix the magnets to the surface of the rotor core by adhesion or the like. In contrast, in the present preferred embodiment, the magnet 43 is press-fitted into the magnet holder 42 after insert molding is completed and hardening is performed. For this reason, the time and effort to adhere the magnet 43 to the rotor core 41 can be saved. Additionally, a plurality of magnets 43 can be easily positioned with high precision.

Features of the above-described preferred embodiments and the modifications thereof may be combined appropriately as long as no conflict arises.

For example, the inclined surface 631 of the magnet holder 42 may be a curved surface as shown in FIG. 7, or may be a planar surface. Additionally, a chamfered inclined surface may be provided not only at the magnet holder 42 but also at the lower end of the magnet 43. If so, the magnet 43 can be more smoothly press-fitted to the magnet holder 42. Additionally, generation of dust accompanying the press-fitting can be further prevented.

The number of the partitioning portions 60 of the magnet holder 42 and the number of the magnets 43 may be different numbers from those of the above preferred embodiments. Additionally the coupling portion 70 of the magnet holder 42 may connect portions other than the lower ends of the plurality of partitioning portions 60.

Additionally, the number of the rotor units 32 included in the rotating portion 3 of the motor 1 may alternatively be one, or may be three or more.

Additionally, the rotating electrical machine of various preferred embodiments of the present invention may be the above motor 1 used for, for example, power steering, or may be motors used for other portions of an automobile. For example, the rotating electrical machine of a preferred embodiment of the present invention may be a motor for generating the driving force of an electric motorcar. Additionally, the rotating electrical machine according to various preferred embodiments of the present invention may be a motor used for any other desirable purpose, such as, an electric power-assisted bicycle, an electric motorcycle, home electronics, OA equipment, a medical instrument, or the like.

Additionally, a generator can also be configured with the structure equivalent to the motor of the above preferred embodiments or modifications thereof. The rotating electrical machine of the present invention may be a generator used for, for example, an automobile, an electric power-assisted bicycle, wind power generation, or the like.

Additionally, the respective elements appearing in the above-described preferred embodiments and modifications thereof may be appropriately combined together within any range where inconsistency does not occur.

The preferred embodiments of the present invention and modifications thereof can be used for a rotor unit, a rotating electrical machine, and a method of manufacturing a rotor unit.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A rotor unit for a rotating electrical machine comprising:
    an annular rotor core including laminated steel sheets that are laminated in a vertical direction;
    a plurality of magnets arranged in a circumferential direction around the rotor core; and
    a holder made of resin that is arranged to hold the plurality of magnets; wherein
    the holder includes a plurality of partitioning portions that extends in the vertical direction along an outer peripheral surface of the rotor core, and a coupling portion that connects the plurality of partitioning portions;
    the rotor core and the holder are made of insert molded material so as to be fixed together;
    a portion of resin that defines the holder is present between the plurality of steel sheets that defines the rotor core in the outer peripheral surface of the rotor core;
    one of the plurality of magnets is press-fitted into a pair of the plurality of partitioning portions that are mutually adjacent;
    each of the plurality of partitioning portions includes:
        a columnar portion located between a pair of the plurality of magnets that are mutually adjacent; and
        a wall portion that partially covers a radial outside surface of the pair of the plurality of magnets; and
    an inner peripheral surface of the wall portion includes an inclined surface that gradually approaches the outer peripheral surface of the rotor core as the inclined surface extends downward in the vertical direction from an upper end of the rotor core in the vertical direction.

2. The rotor unit according to claim 1, wherein an upper end of the wall portion in the vertical direction is located lower than an upper end of the rotor core in the vertical direction.

3. The rotor unit according to claim 1, wherein an upper end of the wall portion in the vertical direction is located lower than an upper end of the columnar portion in the vertical direction.

4. The rotor unit according to claim 1, wherein
    the coupling portion includes a bottom that faces a lower surface of the one of the plurality of magnets in the vertical direction;
    the bottom includes a recess located below two ends of the one of the plurality of magnets in the circumferential direction; and
    the recess is sealed by the one of the plurality of magnets.

5. The rotor unit according to claim 1, wherein
    the rotor core includes a plurality of vertically extending groove portions in an outer peripheral surface thereof;
    the plurality of groove portions have a shape of which a dimension in a width direction decreases toward an outside in a radial direction; and
    the plurality of partitioning portions include engaging portions held within the plurality of groove portions.

6. A rotating electrical machine comprising:
a stationary portion; and
a rotating portion rotatably supported with respect to the stationary portion; wherein
the rotating portion includes the rotor unit according to claim 1, and a shaft inserted into the rotor core; and
the stationary portion includes a bearing that rotatably supports the shaft, and an armature arranged radially outside the rotor unit.

7. The rotor unit according to claim 1, wherein an inner surface of the wall portion is a cylindrical surface along the outer peripheral surface of the plurality of magnets which comes into contact with the outer peripheral surface of the magnet.

8. The rotor unit according to claim 1, wherein a radial inside portion of the coupling portion comes into contact with a lower surface of the rotor core in the vertical direction.

9. A rotor unit for a rotating electrical machine, comprising:
an annular rotor core including, a plurality of laminated steel sheets that are laminated in a vertical direction;
a plurality of magnets arranged in a circumferential direction around the rotor core; and
a holder made of resin that is arranged to hold the plurality of magnets; wherein
the holder includes a plurality of partitioning portions that extends in the vertical direction along, an outer peripheral surface of the rotor core, and a coupling portion that connects the plurality of partitioning portions;
the rotor core and the holder are made of insert molded material so as to be fixed together;
a portion of resin that defines the holder is present between the plurality of steel sheets that defines the rotor core in the outer peripheral surface of the rotor core;
one of the plurality of magnets is press-fitted into a pair of the plurality of partitioning portions that are mutually adjacent; and
ends of the plurality of steel sheets are curved toward an upper side of the rotor core in the vertical direction in a vicinity of the outer peripheral surface of the rotor core.

10. A method of manufacturing a rotor unit for a rotating electrical machine including an annular rotor core including laminated steel sheets that are laminated in a vertical direction, a plurality of magnets arranged in a circumferential direction around the rotor core, and a holder made of resin that holds the plurality of magnets, the method comprising:
a) arranging the rotor core inside a mold, and injecting resin in a fluid state into the mold to insert-mold the holder, wherein a plurality of partitioning portions that extends in the vertical direction along an outer peripheral surface of the rotor core, and a coupling portion that connects the partitioning portions are formed by insert molding; and
b) a magnet of the plurality of magnets is press-fitted to a pair of the plurality of partitioning portions that are mutually adjacent after step a), wherein
in step a), the plurality of partitioning portions is molded in a shape including a columnar portion located between ones of the plurality of magnets that are mutually adjacent, and a wall portion that partially covers radial outside surfaces of the ones of the plurality of magnets that are mutually adjacent; and
an inclined surface that gradually approaches the outer peripheral surface of the rotor core extends downward in the vertical direction from an upper end of the rotor core in the vertical direction is molded on an inner peripheral surface of the wall portion.

11. The manufacturing method according to claim 10, wherein an upper end of the wall portion in the vertical direction is molded at a position lower than an upper end of the rotor core in the vertical direction in step a).

12. The manufacturing method according to claim 10, wherein an upper end of the wall portion in the vertical direction is molded at a position lower than an upper end of the columnar portion in the vertical direction in step a).

13. The manufacturing method according to claim 10, wherein
the coupling portion is molded in a shape including a bottom arranged at a circumferential position between the partitioning portions that are mutually adjacent, and a recess located at both ends of the bottom in a circumferential direction, in step a); and
the magnet of the plurality of magnets seals the recess in step b).

* * * * *